(12) United States Patent
Greenough

(10) Patent No.: US 8,449,649 B2
(45) Date of Patent: May 28, 2013

(54) SYSTEMS AND METHODS FOR STARTING UP PRESSURE SWING ADSORPTION ASSEMBLIES AND HYDROGEN-PRODUCING FUEL PROCESSING SYSTEMS INCLUDING THE SAME

(75) Inventor: Benjamin Charles Greenough, Bend, OR (US)

(73) Assignee: Idatech, LLC, Bend, OR (US)

(*) Notice: Subject to any disclaimer, the term of this patent is extended or adjusted under 35 U.S.C. 154(b) by 238 days.

(21) Appl. No.: 13/095,345

(22) Filed: Apr. 27, 2011

(65) Prior Publication Data
US 2011/0277630 A1   Nov. 17, 2011

Related U.S. Application Data

(60) Provisional application No. 61/333,683, filed on May 11, 2010.

(51) Int. Cl.
*B01D 53/047* (2006.01)

(52) U.S. Cl.
USPC .................................. 95/22; 95/96

(58) Field of Classification Search
USPC ................... 95/19, 22, 96, 139, 140
See application file for complete search history.

(56) References Cited

U.S. PATENT DOCUMENTS

| | | | |
|---|---|---|---|
| 2,824,620 A | 2/1958 | De Rosset | |
| 3,336,730 A | 8/1967 | McBride et al. | |
| 3,338,681 A | 8/1967 | Kordesch | |
| 3,350,176 A | 10/1967 | Green et al. | |
| 3,469,944 A | 9/1969 | Bocard et al. | |
| 3,522,019 A | 7/1970 | Buswell et al. | |
| 3,564,816 A | 2/1971 | Batta | |
| 3,655,448 A | 4/1972 | Setzer | |
| 3,986,849 A | 10/1976 | Fuderer et al. | |
| 4,098,959 A | 7/1978 | Fanciullo | |
| 4,098,960 A | 7/1978 | Gagnon | |
| 4,175,165 A | 11/1979 | Adlhart | |
| 4,214,969 A | 7/1980 | Lawrance | |
| 4,331,455 A | 5/1982 | Sato | |
| 4,468,235 A | 8/1984 | Hill | |
| 4,925,461 A * | 5/1990 | Gemba et al. | 95/98 |
| 5,096,470 A * | 3/1992 | Krishnamurthy | 95/102 |
| 5,401,589 A | 3/1995 | Palmer et al. | |
| 5,432,710 A | 7/1995 | Ishimaru et al. | |

(Continued)

OTHER PUBLICATIONS

International Search Report and Written Opinion for PCT Patent Application Serial No. PCT/US11/34246, dated Jul. 11, 2011.

*Primary Examiner* — Frank Lawrence, Jr.
(74) *Attorney, Agent, or Firm* — Dascenzo Intellectual Property Law, P.C.

(57) ABSTRACT

Systems and methods for initiating startup of PSA assemblies in hydrogen-processing assemblies, which may include a hydrogen-generation assembly and/or a fuel cell stack. The systems and methods include startup procedures that provide for pressurization of the adsorbent beds of the PSA assembly without the need for a stored quantity or other supply of purified hydrogen gas. The systems and methods additionally or alternatively include startup procedures that restrict or even prevent contamination of portions of the PSA assembly, hydrogen storage devices and/or accumulator tanks with an impure gas stream and/or decrease accumulation of the impure gas stream therein. This impure gas stream may be the mixed gas, reformate, or other gas stream that is intended to be purified by the PSA assembly when the PSA assembly is in its hydrogen-purifying operating state.

16 Claims, 4 Drawing Sheets

U.S. PATENT DOCUMENTS

| | | |
|---|---|---|
| 5,441,559 A | 8/1995 | Petit et al. |
| 5,637,414 A | 6/1997 | Inoue et al. |
| 5,733,359 A | 3/1998 | Doong et al. |
| 5,861,137 A | 1/1999 | Edlund |
| 5,997,594 A | 12/1999 | Edlund et al. |
| 6,083,637 A | 7/2000 | Walz et al. |
| 6,221,117 B1 | 4/2001 | Edlund et al. |
| 6,319,306 B1 | 11/2001 | Edlund et al. |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,494,937 B1 | 12/2002 | Edlund et al. |
| 6,495,277 B1 | 12/2002 | Edlund et al. |
| 6,497,856 B1 | 12/2002 | Lomax, Jr. et al. |
| 6,537,352 B2 | 3/2003 | Edlund et al. |
| 6,562,111 B2 | 5/2003 | Edlund et al. |
| 6,692,545 B2 | 2/2004 | Gittleman et al. |
| 6,890,672 B2 | 5/2005 | Dickman et al. |
| 6,921,597 B2 | 7/2005 | Keefer et al. |
| 7,135,048 B1 | 11/2006 | Edlund et al. |
| 7,160,367 B2 | 1/2007 | Babicki et al. |
| 7,393,382 B2 | 7/2008 | Givens |
| 7,399,342 B2 | 7/2008 | Bizjak |
| 7,416,569 B2 | 8/2008 | Sumi et al. |
| 7,601,302 B2 | 10/2009 | Edlund et al. |
| 7,674,319 B2 * | 3/2010 | Lomax et al. .................. 95/19 |
| 7,837,765 B2 | 11/2010 | Adams et al. |
| 2001/0045061 A1 | 11/2001 | Edlund et al. |
| 2003/0157390 A1 | 8/2003 | Keefer et al. |
| 2003/0192251 A1 | 10/2003 | Edlund et al. |
| 2003/0223926 A1 | 12/2003 | Edlund et al. |
| 2005/0188614 A1 | 9/2005 | Mirkovic et al. |
| 2006/0088468 A1 | 4/2006 | Sumi et al. |
| 2006/0177372 A1 | 8/2006 | Doshi |
| 2007/0237994 A1 | 10/2007 | Nakai et al. |
| 2007/0266631 A1 | 11/2007 | Pledger et al. |
| 2008/0222954 A1 | 9/2008 | Adams et al. |
| 2008/0289255 A1 | 11/2008 | Wheat et al. |
| 2009/0151249 A1 | 6/2009 | Adams et al. |
| 2009/0151560 A1 | 6/2009 | Adams et al. |
| 2009/0155642 A1 | 6/2009 | Popham |
| 2011/0150756 A1 * | 6/2011 | Adams et al. .................. 423/657 |

* cited by examiner

SYSTEMS AND METHODS FOR STARTING UP PRESSURE SWING ADSORPTION ASSEMBLIES AND HYDROGEN-PRODUCING FUEL PROCESSING SYSTEMS INCLUDING THE SAME

RELATED APPLICATION

The present application claims priority to similarly entitled U.S. Provisional Patent Application Ser. No. 61/333,683, which was filed on May 11, 2010, and the complete disclosure of which is hereby incorporated by reference.

FIELD OF THE DISCLOSURE

The present disclosure is directed generally to pressure swing adsorption assemblies configured to produce a product hydrogen stream from a mixed gas stream delivered thereto and more particularly to systems and methods for starting up such pressure swing adsorption assemblies and hydrogen-producing fuel processing systems including the same.

BACKGROUND OF THE DISCLOSURE

Pressure swing adsorption (PSA) is a process that may be used to remove impurities from an impure hydrogen gas stream by selective adsorption of one or more of the impurities present in the impure hydrogen stream. The adsorbed impurities may be subsequently desorbed and removed from the PSA assembly. PSA is a pressure-driven separation process that utilizes a plurality of adsorbent beds. The beds are cycled through a series of steps, such as pressurization, separation (adsorption), equalization, depressurization (desorption), and purge steps, which also may be referred to as a PSA cycle, to selectively remove impurities from the hydrogen gas and then desorb the impurities. The operation of PSA assemblies may include a plurality of operating states, which also may be referred to as PSA states and/or PSA operating states. These states may include, but are not limited to: a hydrogen-purifying state (i.e., a running state), a shutdown state, a dormant state, and a startup state.

The dormant state refers to when the PSA assembly has completed its shutdown state and is not being used. Typically, the PSA assembly will be transitioned from its running state to its shutdown state and then to its dormant state. In some PSA assemblies, the adsorbent beds may be depressurized during the shutdown state, and thereby will not be pressurized in the dormant state, whereas in other PSA assemblies, the adsorbent beds may be pressurized in these states.

The startup state may include a series of steps selected and/or configured to transition the PSA assembly from the dormant state to the hydrogen-purifying state. When a portion (or all) of the PSA assembly (such as one or more adsorbent beds) is not pressurized when in the dormant state, the assembly may need to be pressurized, such as during the startup state, prior to initiation of other PSA process steps in order to provide the pressures and/or pressure differentials necessary for operation of the PSA assembly.

Conventionally, this pressurization may include pressurizing the PSA assembly with a mixed gas stream, such as a reformate stream produced by a hydrogen-producing fuel processor, a hydrogen-generation assembly, or another source of impure hydrogen gas. However, this mixed gas stream may contain a significant concentration of impurities, namely, a concentration of impurities that exceeds an acceptable level of impurities during operation of the PSA assembly in the hydrogen-purifying state. Pressurization of the PSA assembly with the mixed gas stream during startup of the PSA assembly may result in flow of the mixed gas stream or other impure gas stream into regions of the PSA assembly that are intended to contain primarily purified hydrogen gas during operation of the PSA assembly in the hydrogen-purifying state. This may result in reduced hydrogen purity during initial operation of the PSA assembly in the hydrogen-purifying state, the need to utilize hydrogen gas as a purge stream during the startup state to remove these impurities, and/or longer and/or more complicated startup procedures.

SUMMARY OF THE DISCLOSURE

Systems and methods for initiating startup of PSA assemblies in hydrogen-processing assemblies, which may include a hydrogen-generation assembly and/or a fuel cell stack. The systems and methods include startup procedures that provide for pressurization of the adsorbent beds of the PSA assembly without the need for a stored quantity or other supply of purified hydrogen gas. The systems and methods additionally or alternatively include startup procedures that restrict or even help prevent contamination of portions of the PSA assembly, hydrogen storage devices, and/or accumulator tanks by an impure gas stream and/or decrease accumulation of the impure gas stream therein. This impure gas stream may be the mixed gas, reformate, or other gas stream that is intended to be purified with the PSA assembly when the PSA assembly is in its hydrogen-purifying operating state.

The systems and methods include startup procedures that may include utilizing a back pressure regulator or similar pressure-regulating device to pressurize the adsorbent beds of the PSA assembly while the PSA effluent stream from the PSA assembly flows through (without accumulation) and/or bypasses an accumulator tank. After pressurization of at least one of the adsorbent beds of the PSA assembly with the mixed gas stream, and optionally after pressurization of most or even all of the adsorbent beds of the PSA assembly with the mixed gas stream, the PSA assembly may perform a series of PSA startup cycles, which optionally may be reduced-duration and/or reduced-stage, PSA cycles. During these PSA startup cycles, the PSA effluent stream may continue to bypass and/or flow through the accumulator without accumulation therein. Thereafter, the backpressure regulator or similar pressure-regulating device may be bypassed, disabled, or otherwise configured to no longer restrict the flow of PSA effluent from the PSA assembly, and this PSA effluent may be permitted to flow through, and accumulate at least temporarily in, the accumulator, such as for use during the hydrogen-purifying state of the PSA assembly, the hydrogen-producing state of a hydrogen-generation assembly, and/or the hydrogen-consuming state of the fuel cell stack.

Illustrative, non-exclusive examples of the systems and methods disclosed herein are shown in the included Figures. Unless indicated otherwise, elements illustrated in dashed lines, or indicated with dashed lead lines, are considered to be optional features, structures, and/or steps, while elements illustrated in solid lines, or indicated with solid lead lines, are typically included in the systems, compositions, and methods disclosed herein. However, elements illustrated in dashed lines and/or those illustrated in solid lines may be omitted from a particular embodiment without departing from the scope of the present disclosure. In addition, the individual features, structures, and/or steps disclosed herein may be organized in any suitable manner without departing from the scope of the present disclosure.

DETAILED DESCRIPTION AND BEST MODE OF THE DISCLOSURE

Figure 1:
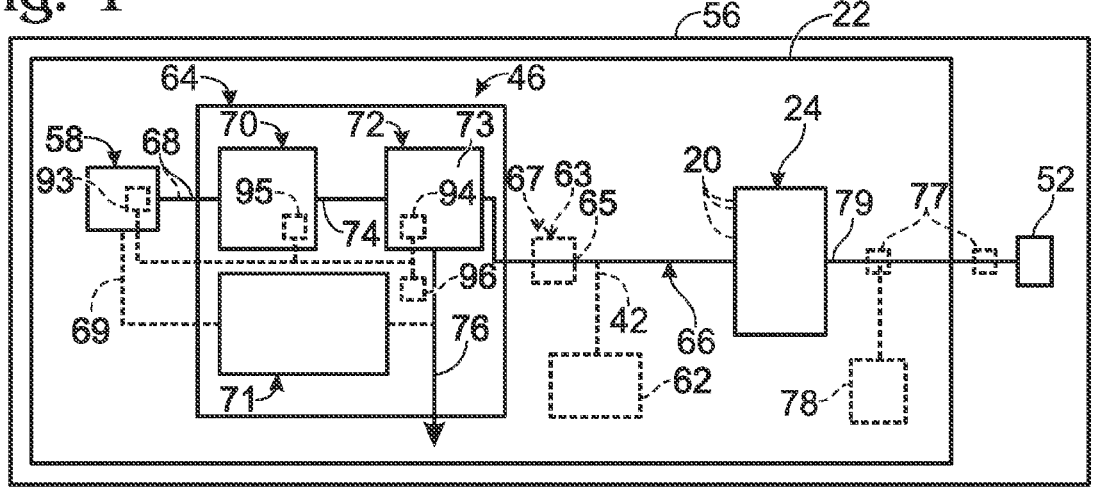
FIG. 1 is an illustrative, non-exclusive example of an energy-producing and consuming assembly according to the present disclosure.

FIG. 1 provides a schematic representation of an illustrative, non-exclusive example of an energy-producing and consuming assembly 56. Energy-producing and consuming assembly 56 includes an energy-producing system 22 and at least one energy-consuming device 52 that is configured to exert an applied load on energy-producing system 22. In the illustrative example, energy-producing system 22 includes a fuel cell stack 24 and a hydrogen-generation assembly 46. More than one of any of the illustrated components may be used without departing from the scope of the present disclosure. The energy-producing system shown in FIG. 1 has been schematically illustrated, and it is within the scope of the present disclosure that such systems also may include additional components that are not specifically illustrated in the schematic figures, such as air delivery systems, heat exchangers, sensors, controllers, control systems, flow-regulating devices, fuel and/or feedstock delivery assemblies, heating assemblies, cooling assemblies, batteries, and the like. System 22 also may be referred to as a fuel cell system and/or a hydrogen-producing fuel cell system.

As illustrated schematically in FIG. 1, hydrogen-generation assembly 46 includes at least a fuel processing system 64 and a feedstock delivery system 58, as well as the associated fluid conduits interconnecting various components of the system. As used herein, the term "hydrogen-generation assembly" may be used to refer to hydrogen-producing fuel processing system 64 and associated components of the energy-producing system, such as feedstock delivery system 58, heating assemblies, separation assemblies or devices, air delivery systems, fuel delivery systems, fluid conduits, heat exchangers, cooling assemblies, sensor assemblies, flow regulators, controllers, etc. All of these illustrative components are not required to be included in all hydrogen-generation assemblies and/or used with all fuel processing systems according to the present disclosure. Similarly, other components may be included or used as part of the hydrogen-generation assembly. Likewise, hydrogen-generation assembly 46 and/or the subsequently described PSA assembly 73 may be utilized without fuel cell stack 24 and/or without energy-consuming device 52 without departing from the scope of the present disclosure.

The hydrogen-generation assembly, including the hydrogen-producing region thereof, may be selectively configured in and between a plurality of operating states, which additionally or alternatively may be referred to herein as HGA (or HPR) states and/or as HGA (or HPR) operating states. This configuration and transition may be implemented and/or controlled via any suitable manual and/or computerized mechanism. These operating states may include but are not limited to: a hydrogen-producing state, in which the hydrogen-generation assembly is receiving feedstock supply stream(s) 68 and producing a mixed gas (or reformate) stream 74; a shutdown state, in which the hydrogen-generation assembly is performing the actions necessary to transition from the hydrogen-producing state to a dormant state; a dormant state, in which the hydrogen-generation assembly is not actively receiving or emitting streams and is not heated and/or pressurized to be "primed" to produce the mixed gas stream; and a startup state, in which the hydrogen-generation assembly is performing the actions necessary to transition from the dormant state to the hydrogen-producing state. Although not required to all hydrogen-generation assemblies according to the present disclosure, in some embodiments, the HGA (or HPR) operating states may further include a fault, or faulted, state, in which the system has detected a fault condition and may await user input or transition to any other operating state depending on the severity of the fault and the ability of the system to automatically recover from the fault; and/or an idle state, in which the hydrogen-generation assembly is ready (i.e. heated, primed, and/or pressurized to a suitable hydrogen-producing temperature and/or pressure) to receive feedstock supply stream(s) 68 and to produce mixed gas stream 74 therefrom. These "operating states" also may be referred to as "states," and it is within the scope of the present disclosure that a particular hydrogen-generation assembly may utilize some or all of the illustrative, non-exclusive examples of operating states described herein. It is further within the scope of the present disclosure that a hydrogen-generation assembly may utilize one or more additional operating states in place of, or in addition to, the illustrative, non-exclusive examples of operating states described herein.

Feedstock delivery system 58 is configured to deliver to fuel processing system 64 one or more feedstocks via one or more feed streams, which may be referred to generally as feedstock supply stream(s) 68 and/or feed stream(s) 68. Illustrative, non-exclusive examples of feedstock delivery systems are disclosed in U.S. Pat. Nos. 7,601,302, 6,375,906, 7,135,048, and 6,890,672 and U.S. Patent Application Publication No. 2009/0155642, the complete disclosures of which are hereby incorporated by reference. In the following discussion, reference may be made only to a single feedstock supply stream; however, it is within the scope of the present disclosure that two or more such streams, of the same or different composition, may be used. In some embodiments, air may be supplied to fuel processing system 64 via a blower, fan, compressor, or other suitable air delivery system, and/or a water stream may be delivered from a separate water source.

Fuel processing system 64 includes any suitable device(s) and/or structure(s) that are configured to produce hydrogen gas from feedstock supply stream(s) 68. As schematically illustrated in FIG. 1, fuel processing system 64 includes a hydrogen-producing region 70. Accordingly, fuel processing system 64 may be described as including a hydrogen-producing region 70 that produces a hydrogen-rich stream 74 that includes hydrogen gas as a majority component from the feedstock supply stream. While hydrogen-rich stream 74 contains hydrogen gas as its majority component, it also contains other gases as minority components, and as such may be referred to as a mixed gas stream that contains hydrogen gas and other gases and/or as a reformate stream that contains hydrogen gas and other gases. Illustrative, non-exclusive examples of these other gases, or impurities, include one or more of carbon monoxide, carbon dioxide, water, methane, and unreacted feedstock.

Illustrative, non-exclusive examples of suitable mechanisms for producing hydrogen gas from feedstock supply stream(s) or feed stream(s) 68 in hydrogen-producing region 70 include steam reforming and autothermal reforming, in which reforming catalysts are used to produce hydrogen gas from a feedstock supply stream 68 containing water and at least one carbon-containing feedstock. Other illustrative, non-exclusive examples of suitable mechanisms for producing hydrogen gas include pyrolysis and catalytic partial oxidation of a carbon-containing feedstock, in which case feedstock supply stream 68 does not contain water. Still another suitable mechanism for producing hydrogen gas is electrolysis, in which case the feedstock is water. Illustrative, non-exclusive examples of suitable carbon-containing feedstocks include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol.

When the carbon-containing feedstock is miscible with water, the carbon-containing feedstock may be, but is not required to be, delivered to the fuel processor in the same feed stream as the water component of feed stream 68. For example, when the fuel processor receives a feed stream containing water and a water-soluble alcohol, such as methanol, these components may be premixed and delivered as a single feed stream. As an illustrative, non-exclusive example, a reforming feed stream may contain approximately 25-75 vol % methanol or ethanol or another suitable water-miscible carbon-containing feedstock, and approximately 25-75 vol % water. For feed streams formed (at least substantially) of methanol and water, the streams will typically contain approximately 50-75 vol % methanol and approximately 25-50 vol % water. Feed streams 68 containing ethanol or other water-miscible alcohols will typically contain approximately 25-60 vol % alcohol and approximately 40-75 vol % water. For hydrogen-generating assemblies that utilize steam reforming or autothermal reforming reactions to produce hydrogen gas, an illustrative, non-exclusive example of a feed stream contains 69 vol % methanol and 31 vol % water, although other compositions and liquid carbon-containing feedstocks may be used without departing from the scope of the present disclosure. It is within the scope of the present disclosure that such a feed stream 68 that contains both water and at least one carbon-containing feedstock may be used as the feed stream for hydrogen-producing region 70 and as a combustible fuel stream 69 for a heating assembly (when present) that is configured to heat at least the hydrogen-producing region of the fuel processing assembly, such as to a suitable hydrogen-producing temperature.

Hydrogen-generation assembly 46 may utilize more than a single hydrogen-producing mechanism in hydrogen-producing region 70 and may include more than one hydrogen-producing region. Each of these mechanisms is driven by, and results in, different thermodynamic balances in hydrogen-generation assembly 46. Accordingly, hydrogen-generation assembly 46 may further include a temperature modulating assembly 71, such as a heating assembly and/or a cooling assembly. Temperature modulating assembly 71 may be configured as part of fuel processing system 64 or may be an external component that is in thermal and/or fluid communication with hydrogen-producing region 70. Temperature modulating assembly 71 may consume, or combust, a fuel stream, such as to generate heat, may consist of an electrical heater, and/or may direct heat energy from another source to the hydrogen-generation assembly. While not required in all embodiments of the present disclosure, the combustible fuel stream may be delivered from the feedstock delivery system. For example, and as indicated in dashed lines in FIG. 1, this fuel, or feedstock, may be received from feedstock delivery system 58 via a fuel supply stream 69. In some embodiments, the hydrogen-producing region and the temperature modulating assembly may receive feedstock supply streams and fuel streams, respectively, having the same compositions, including (but not limited to) streams containing a carbon-containing feedstock and at least 25 volume percent water. Fuel supply stream 69 may include combustible fuel or, alternatively, may include fluids to facilitate cooling. Temperature modulating assembly 71 also may receive some or all of its fuel from other sources or supply systems, such as from one or more additional storage tanks and/or from a separation assembly 72, which in some embodiments may be or include a PSA assembly 73. The temperature modulating assembly also may receive an air stream from any suitable source, including the environment within which the assembly is located. Blowers, fans, and/or compressors may be used to provide the air stream, but this is not required to all embodiments.

Temperature modulating assembly 71 may include one or more heat exchangers, burners, combustion systems, and other such devices for supplying heat to regions of the fuel processing system and/or other portions of energy-producing and consuming assembly 56. Depending on the configuration of hydrogen-generation assembly 46, temperature modulating assembly 71 also may, additionally or alternatively, include heat exchangers, fans, blowers, cooling systems, and other such devices for cooling regions of fuel processing system 64 or other portions of energy-producing and consuming assembly 56. For example, when fuel processing system 64 is configured with a hydrogen-producing region 70 that utilizes a steam reforming or another endothermic reaction to produce hydrogen gas, temperature modulating assembly 71 may include systems for supplying heat to maintain the temperature of hydrogen-producing region 70 and the other components in the proper temperature range for producing hydrogen gas.

When the fuel processing system is configured with a hydrogen-producing region 70 based on catalytic partial oxidation or another exothermic reaction, temperature modulating assembly 71 may include systems for removing heat, i.e., supplying cooling, to maintain the temperature of the fuel processing system in the proper temperature range. As used herein, the term "heating assembly" is used to refer generally to temperature modulating assemblies that are configured to supply heat or otherwise increase the temperature of all or selected regions of the fuel processing system. As used herein, the term "cooling assembly" is used to refer generally to temperature modulating assemblies that are configured to cool, or reduce the temperature of, all or selected regions of the fuel processing system.

The hydrogen-generation assembly 46 may be configured to produce at least substantially pure hydrogen gas, and even pure, or purified, hydrogen gas. For the purposes of the present disclosure, substantially pure hydrogen gas is greater than 90% pure, and may be greater than 95% pure, greater than 99% pure, greater than 99.5% pure, or even greater than 99.9% pure. Unless otherwise specified herein, compositional percentages refer to volume percentages, or vol %. Illustrative, non-exclusive examples of suitable fuel processing systems are disclosed in U.S. Pat. Nos. 6,221,117, 5,997,594, 5,861,137, and in U.S. Patent Application Publication Nos. 2001/0045061, 2003/0192251, and 2003/0223926. The complete disclosures of the above-identified patents and patent applications are hereby incorporated by reference.

Hydrogen gas from fuel processing system 64 may be delivered to one or more of a storage device 62, such as via storage hydrogen stream 42, an accumulator 63, and/or to fuel cell stack 24. This is schematically depicted in FIG. 1, and it is within the scope of the present disclosure that fuel processing system 64, energy-producing system 22, and/or energy-producing and consuming assembly 56 may include any suitable conduits, valves, flow regulators, and/or the like to selectively enable and/or disable one and/or two-way flow of any suitable fluid to and/or from these components thereof.

Some or all of hydrogen stream 66, which also may be referred to as product hydrogen stream 66, may additionally, or alternatively, be delivered, via a suitable conduit, for use in another hydrogen-consuming process, burned for fuel or heat, or stored for later use. Fuel cell stack 24 includes at least one fuel cell 20, and typically includes a plurality of fluidly and electrically interconnected fuel cells. When these cells are connected together in series, the power output of the fuel cell stack is the sum of the power outputs of the individual cells. The fuel cells in fuel cell stack 24 may be connected in series, parallel, or combinations of series and parallel configurations. Fuel cell stack 24 may utilize any suitable type of fuel cell, such as fuel cells that receive hydrogen gas and oxygen gas as a proton source and oxidant source, respectively. Illustrative, non-exclusive examples of types of fuel cells include proton exchange membrane (PEM) fuel cells, alkaline fuel cells, solid oxide fuel cells, molten carbonate fuel cells, phosphoric acid fuel cells, and the like.

Storage device 62 may be any suitable device for storing hydrogen gas produced by fuel processing system 64. Illustrative, non-exclusive examples of suitable storage devices 62 include metal hydride beds, tanks or other suitable pressure vessels for storing hydrogen gas, and adsorption beds containing other hydrogen-adsorbing materials such as sodium alanate, carbon nanotubes, and/or metal-organic polymers. Illustrative, non-exclusive examples of suitable metal hydrides include $LaNi_5$ and other alloys of lanthanum and nickel. The hydride and adsorption beds will typically include a pressure vessel that contains the metal hydride or adsorbent. If the storage device includes a metal hydride bed, the system may be designed to optimize heat transfer to and/or from the metal hydride alloy such that heat may be delivered to the hydride bed at a rate sufficient to produce the desired flow rate of hydrogen gas from the hydride bed and/or removed from the bed at a rate sufficient to allow for the desired hydrogen absorption rate. Thus, the hydride bed may include optimized heat transfer structures, illustrative, non-exclusive examples of which include, but are not limited to, internal or external fins, metal brushes, water pipes, heat pipes, air tubes, thermal ballast, and/or other heat transfer means. The sources of heat may include, separately or in combination, electricity (such as in the form of a resistance heater or other electrically powered heat source), fuel cell stack exhaust, reformer exhaust, fuel cell stack coolant, hot air from a cabinet heater, energy stored as heat in the fuel processor or fuel cell system components, and/or heat from any other suitable source or process.

Accumulator 63, which additionally or alternatively may be referred to as and/or as including an accumulator vessel and/or an accumulator reservoir is sized to temporarily contain a volume of the product hydrogen stream produced by the separation assembly, typically prior to delivery of the product hydrogen stream to fuel cell stack 24 or another hydrogen-consuming device. Unlike a storage device 62, which includes suitable valves or other containment structures to trap the hydrogen gas therein, and thus to at least potentially store the hydrogen gas for prolonged periods of time, accumulator 63 includes at least one open inlet, through which the product hydrogen gas flows from the separation assembly, and at least one open outlet, through which product hydrogen gas flows from the accumulator, such as to the fuel cell stack or other hydrogen-consuming device. Accumulator 63 typically will have a volume that is many, such as tens or even hundreds, of times greater than that of the fluid conduit(s) through which the product hydrogen stream flows from the separation assembly to the accumulator and/or from the accumulator to the fuel cell stack. Accordingly, the accumulator may temporarily retain a buffer, or reserve, of hydrogen gas that may be utilized to normalize, or equalize, variations in the flow rate of the product hydrogen stream from the PSA assembly and/or the demand for (consumption of) the product hydrogen stream by an associated fuel cell stack or other hydrogen-consuming device. In some embodiments, the accumulator, when present, may form a portion of an accumulator assembly 67, which also may include at least a pressure regulator 65 that is configured to regulate the pressure, and thus the flow, of product hydrogen stream 66 from the accumulator.

As discussed in more detail herein, hydrogen-generation assemblies and/or fuel cell systems according to the present disclosure may include a separation assembly 72 that is configured to increase the purity of the hydrogen gas that is produced in the hydrogen-generation assembly prior to delivery to the fuel cell stack and/or to another hydrogen-consuming device as product hydrogen stream 66. This increase in the purity of hydrogen gas in product hydrogen stream 66 when compared to the purity of the hydrogen gas in the mixed gas stream may be accomplished by removing at least a portion of the other gases that are present in the mixed gas stream, such as through the use of at least one physical and/or chemical separation process. For example, the impurities may be chemically reacted to form hydrogen gas, may be removed from the mixed gas stream to form at least a portion of a byproduct stream 76 that may be discharged from the separation assembly, and/or may be at least temporarily trapped or otherwise removed from the mixed gas stream. Product hydrogen stream 66 will therefore have a greater concentration and/or purity of hydrogen gas than the mixed gas stream from which it was formed, and/or will have a lower concentration of the impurities than the mixed gas stream. The removed impurities may form the byproduct stream, which also may include hydrogen gas, and which will have a lower concentration and/or purity of hydrogen gas than the mixed gas stream, and/or will have a greater concentration of the other gases than the mixed gas stream.

Illustrative, non-exclusive examples of suitable methods for removing these impurities include pressure-based separation processes, such as pressure swing adsorption processes performed using PSA assembly 73. In a PSA process, such as may be performed using a PSA assembly according to the present disclosure, gaseous impurities are removed from a stream containing hydrogen gas, as well as other gases. Hydrogen purification using PSA is based upon the principle that impurity gases, under the proper conditions of temperature and pressure, will be adsorbed onto an adsorbent material more strongly than hydrogen gas. These impurities, or "other gases," may thereafter be desorbed and removed, such as in the form of the byproduct stream. The success of using PSA for hydrogen purification is due to the relatively strong adsorption of common impurity gases (such as, but not limited to, CO, $CO_2$, hydrocarbons including $CH_4$, and $N_2$) on the adsorbent material. In contrast, hydrogen gas adsorbs only very weakly and so hydrogen gas passes through the adsorbent bed while the impurities are retained on the adsorbent material.

As discussed in more detail herein, a PSA process typically involves repeated, or cyclical, application of at least pressurization, separation (adsorption), equalization, depressurization (desorption), and purge steps, or processes, to selectively remove impurities from the hydrogen gas and then desorb the impurities. Accordingly, the PSA process may be described as being configured to repeatedly enable a PSA cycle of steps, or stages, such as the above-described steps. The degree of separation is affected by the pressure difference between the pressure of the mixed gas stream and the pressure of the byproduct stream. Thus, the desorption step will typically include reducing the pressure within the portion of the PSA assembly containing the adsorbed gases, and optionally may even include drawing a vacuum (i.e., reducing the pressure to less than atmospheric or ambient pressure) on that portion of the assembly. Similarly, increasing the feed pressure of the mixed gas stream to the adsorbent regions of the PSA assembly may beneficially affect the degree of separation during the adsorption step.

As discussed, a separation assembly 72 according to the present disclosure will include at least one PSA assembly 73. It is within the scope of the present disclosure that the separation assembly may additionally include one or more other separation structures and/or utilize one or more other separation processes to remove impurities from the mixed gas stream. Illustrative, non-exclusive examples of such optional other separation processes and/or structures include methanation of the other gases using a methanation catalyst, water-gas shift reactions using a suitable shift catalyst, and/or separation of impurities using at least one hydrogen-selective membrane. Illustrative, non-exclusive examples of suitable separation processes and structures are disclosed in U.S. Pat. Nos. 6,537,352, 6,494,937, 7,393,382, and 7,399,342 and in U.S. Patent Application Publication No. 2007/0266631, the complete disclosures of which are hereby incorporated by reference.

When present, at least one energy-consuming device 52 may be electrically coupled to energy-producing system 22, such as to fuel cell stack 24 and/or to one or more energy-storage devices 78 associated with the energy-producing system. Energy-consuming device 52 applies a load to energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative, non-exclusive examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for energy-producing system 22 of which fuel cell stack 24 forms a part.

As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52 and/or energy storage device 78. Module 77 may include such illustrative structures as buck or boost converters, inverters, power filters, and the like.

Energy-storage device 78, when included, may be configured to store at least a portion of the electrical output, or power, 79 from fuel cell stack 24. An illustrative, non-exclusive example of a suitable energy-storage device 78 is a battery, but other energy-storage devices may be used, such as flywheels, supercapacitors, and ultracapacitors. Energy-storage device 78 may additionally or alternatively be used to power energy-producing system 22, or components thereof, during start-up of the system.

Figure 2:
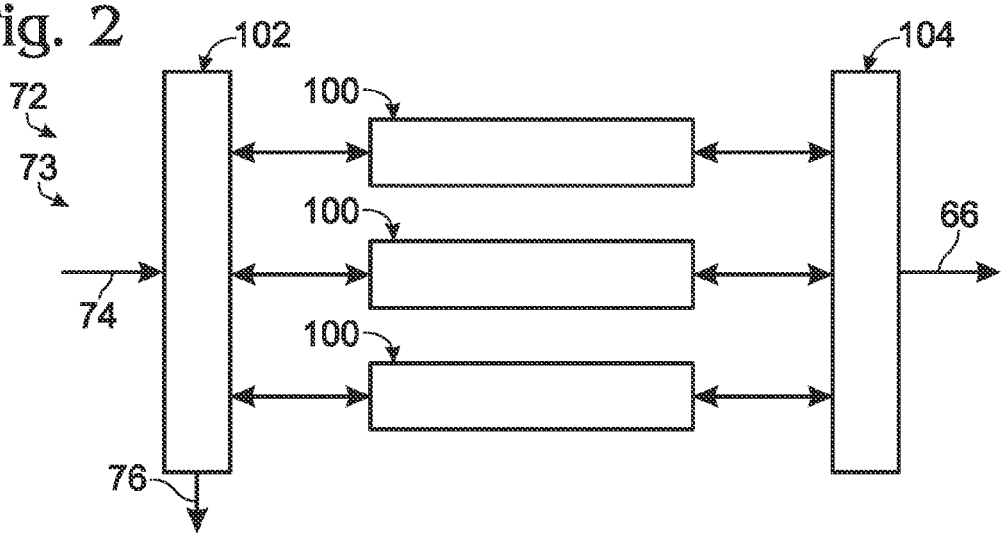
FIG. 2 is an illustrative, non-exclusive example of a pressure swing adsorption assembly that may be utilized with the systems and methods according to the present disclosure.

As discussed herein, the systems and methods according to the present disclosure may include the use of pressure swing adsorption (PSA) to purify the mixed gas stream and produce a product hydrogen stream suitable for use in fuel cell stack 24. FIG. 2 is an illustrative, non-exclusive example of a PSA assembly 73 that may form at least a portion of separation assembly 72 and may be utilized with the systems and methods according to the present disclosure. As shown, PSA assembly 73 includes a plurality of adsorbent beds 100 that are fluidly connected via distribution assemblies 102 and 104. Adsorbent beds 100 may additionally or alternatively be referred to as adsorbent chambers or adsorption regions. The distribution assemblies have been schematically illustrated in FIG. 2 and may include any suitable structure for selectively establishing and restricting fluid flow between and/or among the beds and/or the input and/or output streams of PSA assembly 73. As shown, the input and output streams include at least mixed gas stream 74, product hydrogen stream 66, and byproduct stream 76.

Illustrative, non-exclusive examples of suitable distribution assembly structures include one or more of manifolds, such as distribution and collection manifolds that are respectively configured to distribute fluid to and collect fluid from the beds, and valves, such as check valves, solenoid valves, purge valves, and the like. In the illustrative, non-exclusive example of FIG. 2, three beds 100 are shown; but it is within the scope of the present disclosure that the number of beds may vary, such as to include more or fewer beds than shown in FIG. 2. Typically, PSA assembly 73 will include at least two beds, and often will include three, four, or more beds. While not required, PSA assembly 73 may be configured to provide a continuous flow of product hydrogen stream 66, with at least one of the plurality of beds exhausting this stream when the assembly is in use, and to receive a continuous flow of mixed gas stream 74. Optionally, accumulator 63 may cooperate with PSA assembly 73 to enable the fuel processing system to produce a constant flow of hydrogen stream 66 and/or byproduct stream 76.

In the illustrative, non-exclusive example of FIG. 2, distribution assembly 102 is configured to selectively deliver mixed gas stream 74 to the plurality of beds and to collect and exhaust byproduct stream 76. Similarly, distribution assembly 104 is configured to collect the purified hydrogen gas that passes through the beds and which forms product hydrogen stream 66, and in some embodiments to deliver a portion of the purified hydrogen gas to the beds for use as a purge stream. The distribution assemblies may be configured for fixed or rotary positioning relative to the beds. Furthermore, the distribution assemblies may include any suitable type and/or number of structures and/or devices to selectively distribute, regulate, meter, prevent, and/or collect flows of the corresponding gas streams. As illustrative, non-exclusive examples, distribution assembly 102 may include mixed gas and exhaust manifolds, or manifold assemblies, and distribution assembly 104 may include product and purge manifolds, or manifold assemblies. In practice, PSA assemblies that utilize distribution assemblies that rotate relative to the beds may be referred to as rotary pressure swing adsorption assemblies, and PSA assemblies in which the manifolds and beds are not configured to rotate relative to each other to selectively establish and restrict fluid connections may be referred to as fixed bed, or discrete bed, pressure swing adsorption assemblies. Both constructions are within the scope of the present disclosure.

Gas purification by pressure swing adsorption involves sequential pressure cycling and flow reversal of gas streams relative to the adsorbent beds. In the context of purifying a mixed gas stream comprised substantially of hydrogen gas, the mixed gas stream is delivered under relatively high pressure to one end of the adsorbent beds and thereby exposed to the adsorbent(s) contained in the adsorbent region thereof. Illustrative, non-exclusive examples of delivery pressures for mixed gas stream 74 include pressures in the range of 40-200 psi, such as pressures in the range of 50-150 psi, 50-100 psi, 60-95 psi, 70-95 psi, 75-90 psi, 80-90 psi, 100-150 psi, 70-100 psi, etc., although pressures outside of this range are also within the scope of the present disclosure. As the mixed gas stream flows through the adsorbent region, carbon monoxide, carbon dioxide, water and/or other ones of the impurities, or other gases, are adsorbed, and thereby at least temporarily retained, on the adsorbent. This is because these gases are more readily adsorbed on the selected adsorbents used in the PSA assembly when compared to hydrogen gas. The remaining portion of the mixed gas stream, which now may perhaps more accurately be referred to as a purified hydrogen stream, passes through the bed and is exhausted from the other end of the bed. In this context, hydrogen gas may be described as being the less readily adsorbed component, while carbon monoxide, carbon dioxide, etc. may be described as the more readily adsorbed components of the mixed gas stream. The pressure of the product hydrogen stream may be reduced prior to utilization of the gas by the fuel cell stack.

To remove the adsorbed gases, the flow of the mixed gas stream is stopped, the pressure in the bed is reduced, the adsorbed gasses are desorbed from the adsorbent, and the desorbed gases are exhausted from the bed. The desorption step often includes selectively decreasing the pressure within the adsorbent region through the withdrawal of gas, typically in a countercurrent direction relative to the feed direction. This desorption step also may be referred to as a depressurization, or blowdown, step. This step may include and/or be performed in conjunction with the use of a purge gas stream, which may be delivered in a countercurrent flow direction to the direction at which the mixed gas stream flows through the adsorbent region. An illustrative, non-exclusive example of a suitable purge gas stream includes a portion of the product hydrogen stream, as this stream is comprised of hydrogen gas, which is less readily adsorbed than the adsorbed gases. Other gases may be used in the purge gas stream, although these gases preferably are less readily adsorbed than the adsorbed gases, are not adsorbed, or are only weakly adsorbed, on the adsorbent(s) being used.

As discussed, this desorption step may include drawing an at least partial vacuum on the bed, but this is not required. While also not required, it is within the scope of the present disclosure that the PSA cycle may utilize one or more equalization steps, in which two or more adsorbent beds are fluidly interconnected to provide for the equalization of the relative pressures therebetween. For example, one or more equalization steps may precede the desorption and pressurization steps. Prior to the desorption step, equalization is used to reduce the pressure in the bed and to recover some of the purified hydrogen gas contained in the bed, while prior to the (re)pressurization step, equalization is used to increase the pressure within the bed. Equalization may be accomplished using concurrent and/or countercurrent flow of gas. After the desorption and/or purge step(s) of the desorbed gases is completed, the bed is again pressurized and ready to receive and remove impurities from the portion of the mixed gas stream delivered thereto.

For example, when a bed is ready to be regenerated, it may be at a relatively high pressure and may contain a quantity of hydrogen gas. While this gas (and pressure) may be removed simply by venting the bed, other beds in the assembly may need to be pressurized prior to being used to purify the portion of the mixed gas stream delivered thereto. Furthermore, the hydrogen gas in the bed to be regenerated preferably is recovered so as not to negatively decrease the efficiency of the PSA assembly. Therefore, interconnecting these beds in fluid communication with each other provides a mechanism by which the pressure and hydrogen gas in the bed to be regenerated may be reduced while also increasing the pressure and hydrogen gas in a bed that will be used to purify impure hydrogen gas (i.e., mixed gas stream 74) that is delivered thereto. In addition to, or in place of, one or more equalization steps, a bed that will be used to purify the mixed gas stream may be pressurized prior to the delivery of the mixed gas stream to the bed. For example, some of the product hydrogen stream may be delivered to the bed to pressurize the bed. While it is within the scope of the present disclosure to deliver this pressurization gas to either end of the bed, in some embodiments, the pressurization gas may be delivered to the opposite end of the bed than the end to which the mixed gas stream is delivered.

The PSA assembly may be selectively configured, or transitioned, between a plurality of operating states, which also may be referred to as PSA states and/or PSA operating states. These states may include, but are not limited to: a hydrogen-purifying state (i.e., running) state, in which the PSA assembly is receiving mixed gas stream 74 and emitting product hydrogen stream 66 and/or byproduct stream 76; a shutdown state, in which the PSA assembly is performing the actions necessary to transition from the hydrogen-purifying state to a dormant state; a dormant state, in which the PSA assembly is not actively receiving or emitting gas streams on a substantially continuous basis; and a startup state, in which the PSA assembly is performing the actions necessary to transition from the dormant state to the hydrogen-purifying state. The PSA states optionally may include a fault state, in which the system has detected a fault condition and may await user input or transition to any other operating state depending on the severity of the fault and the ability of the system to automatically recover from the fault, and/or an idle state, in which the PSA assembly is primed or otherwise configured to receive input streams and produce purified output streams. The PSA assembly may additionally or alternatively include one or more additional operating states, in place of and/or in addition to the illustrative, non-exclusive examples of PSA states described above, and it is also within the scope of the present disclosure that a PSA assembly may not include all of the illustrative, non-exclusive examples of PSA states described above.

The previously discussed pressurization, separation, depressurization, purge, and equalization steps of the PSA assembly may occur during the hydrogen-purifying state and may be referred to as a PSA cycle. As used herein, cycle time may refer to the time required to perform a complete PSA cycle, while phase time, step time, and/or state time may refer to the time required to perform an individual PSA step, such as pressurization, separation, depressurization, purge, or equalization. The sequencing, duration, and/or timing of these steps may be defined, regulated, and/or otherwise controlled by a controller, manually, by the inherent operation of the PSA assembly, and/or by combinations thereof.

The above discussion of the general operation of a PSA assembly has been somewhat simplified. Illustrative, non-exclusive examples of pressure swing adsorption assemblies, including components thereof and methods of operating the same, are disclosed in U.S. Pat. Nos. 3,564,816, 3,986,849, 4,331,455, 5,441,559, 6,497,856, 6,692,545, 7,160,367, 7,393,382, 7,399,342, 7,416,569, U.S. Patent Application Publication Nos. 2009/0151249 and 2009/0151560, U.S. Provisional Patent Application No. 61/287,601, and U.S. patent application Ser. No. 12/963,530, the complete disclosures of which are hereby incorporated by reference.

In the above discussion of a PSA assembly, timing of the various gas flows, together with the opening and closing of appropriate valves and control of other system hardware, software, and/or other controls may be accomplished via any suitable manner or mechanism. For example, this control may be implemented manually by the user, through the use of a controller, or by a combination of the two. The controller may include any suitable type and number of devices or mechanisms to implement and provide for the desired monitoring and/or control of the PSA assembly. As illustrative, non-exclusive examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into the PSA assembly or be a separate, stand-alone computing device. The controller may be configured or otherwise programmed or designed to control the operation of the PSA assembly in the plurality of operating states of the PSA assembly. This may include optionally controlling transitions of the PSA assembly between the stages of the PSA cycle, such as during the shutdown and/or startup states of the PSA assembly. The controller, when present, also may include and/or be in communication with any suitable sensors, detectors, communications links, and the like to enable the desired monitoring and control of the operation of the PSA assembly, including optional communication with other components of the energy-producing and consuming assembly.

It is also within the scope of the present disclosure that the PSA controller, when present, may be configured or otherwise programmed or configured to control other components of the energy-producing and consuming assembly, including the fuel processing system, hydrogen-generation assembly, feedstock delivery system, hydrogen source, fuel cell stack, power management module, and the like. Likewise, it is within the scope of the present disclosure that other components of the energy-producing and consuming assembly may include a dedicated or even integrated controller that is configured to monitor and/or control the operation of this/these other component(s), and where applicable, control the transitions of these components between their respective operating states. As an illustrative, non-exclusive example, the hydrogen-generation assembly, and optionally, the fuel processing system and/or hydrogen-producing region thereof, may include or be in communication with a controller that is configured to monitor and/or control the operation thereof, including configuring the assembly and/or system between its operating states. When the energy-producing and consuming assembly includes two or more controllers, the controllers may be in communication with each other. It is also within the scope of the present disclosure that the energy-producing and consuming assembly may include a single controller that monitors and/or controls the operation of two or more components thereof, such as the PSA assembly and at least a portion of the fuel processing system and/or fuel cell stack.

The controller may be configured to monitor one or more variables of the PSA assembly, energy-producing system, and/or energy-producing and consuming assembly, including values associated with these systems and assemblies. By "associated with," it is meant that the controller is configured to measure, calculate, or otherwise detect, directly or indirectly, the value of the measured variable or parameter. The value of the measured variable may be directly inputted to the controller. However, it is also within the scope of the present disclosure that the controller may be configured to receive an input that is representative of the variable of interest or derived from the measured value of the variable. This may include a digital representation thereof, an error signal indicative of the value of the variable based upon a threshold or prior value thereof, and/or a normalized or scaled value of the measured variable.

A controller that is integrated into and/or otherwise specifically associated with feedstock delivery system 58 is schematically indicated in FIG. 1 at 93, a controller that is integrated into and/or otherwise specifically associated with PSA assembly 73 is schematically indicated in FIG. 1 at 94, and a controller that is integrated into and/or otherwise specifically associated with fuel processing system 64 is schematically indicated in FIG. 1 at 95. For the purpose of completeness, a controller that is in communication with at least hydrogen-generation assembly 46 to monitor and control the operation of components thereof, such as at least PSA assembly 73 and hydrogen-producing region 70, is schematically indicated in FIG. 1 at 96. It is within the scope of the present disclosure that one or more (or even all) of the illustrative controllers described above may be in communication with each other and/or may be integrated or otherwise incorporated together into a single controller for the fuel processing system.

Figure 3:
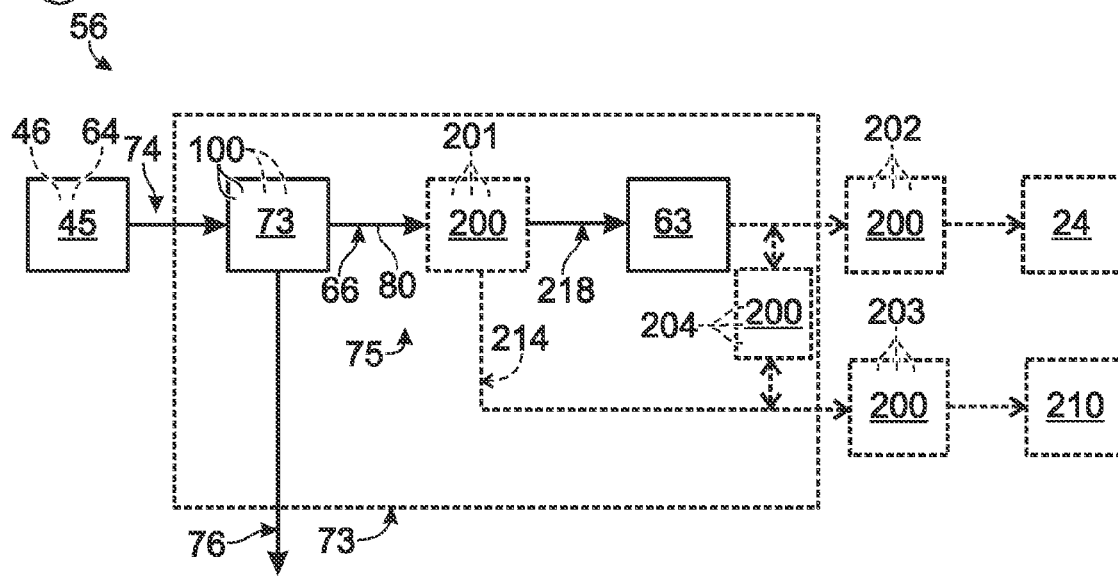
FIG. 3 is an illustrative, non-exclusive example of an energy-producing and consuming assembly, including a pressure swing adsorption assembly, according to the present disclosure.

FIG. 3 provides another illustrative, non-exclusive example of energy-producing and consuming assembly 56, including a pressure swing adsorption assembly 73, according to the present disclosure. In FIG. 3, fuel source 45, such as fuel processing system 64 and/or hydrogen-generation assembly 46, may supply a mixed gas stream 74 to PSA assembly 73. As discussed herein, PSA assembly 73 may include a plurality of adsorbent beds 100 that may separate the mixed gas stream into a PSA effluent stream 75 and byproduct stream 76. When the PSA assembly is in its hydrogen-purifying state, PSA effluent stream 75 also may be referred to as product hydrogen stream 66, and will contain substantially pure hydrogen gas. Similarly, when the PSA assembly is in the hydrogen-purifying state, byproduct stream 76 will be produced during the PSA process as a separate exhaust, or impurity-rich, stream. Additionally or alternatively, and as discussed in more detail herein, it is within the scope of the present disclosure that the mixed gas stream may be utilized to pressurize at least a portion of PSA assembly 73 and/or adsorbent beds 100, such as when the PSA assembly is in the startup state.

When the mixed gas stream is used to pressurize at least a portion of the PSA assembly, the mixed gas stream may flow into and/or through adsorbent beds 100 without purification and/or without substantial purification of the mixed gas stream. Under these conditions, the adsorbent beds and/or the PSA assembly may not discharge the byproduct stream. Additionally or alternatively, under these conditions PSA effluent stream 75 may include some partially purified hydrogen gas, as well as impurities 80 that otherwise would be, or at least would be substantially, removed from the PSA effluent stream and discharged in the byproduct stream if the PSA assembly was in the hydrogen-purifying state.

Energy-producing and consuming assemblies 56 according to the present disclosure may include one or more flow regulating assemblies 200 that may include one or more flow regulating devices that are configured to alter, change, divide, stop, regulate, restrict, increase, decrease, combine, and/or control the flow of the streams supplied thereto. As an illustrative, non-exclusive example, PSA effluent stream 75 may optionally flow from adsorbent beds 100 to flow regulating assembly 200, such as to flow regulating device 201. A portion of PSA effluent stream 75 may be supplied from flow regulating device 201 to accumulator 63, which also may be referred to herein as reservoir 63 and/or buffer tank 63, as accumulator stream 218 and may optionally be supplied to flow regulating device 202 before being supplied to fuel cell stack 24.

Additionally or alternatively, flow regulating device 201 may direct, enable, or otherwise provide a fluid conduit for a portion of PSA effluent stream 75 to bypass accumulator 63 as bypass stream 214 and optionally be supplied to flow regulating device 203 before being supplied to hydrogen disposal device 210. It is also within the scope of the present disclosure that flow regulating device 204 may direct, enable, or otherwise provide a fluid conduit for a portion of accumulator stream 218 to mix with a portion of bypass stream 214, such as before delivery to hydrogen disposal device 210.

Hydrogen disposal device 210 may include any suitable device for storing, reacting, and/or releasing bypass stream 214 and/or accumulator stream 218. Illustrative, non-exclusive examples of hydrogen disposal devices 210 according to the present disclosure include the hydrogen storage devices discussed herein, hydrogen burners, including catalytic and fired burners and/or temperature modulating assemblies 71 used to heat at least hydrogen producing region 70 of hydrogen generation assembly 46, and/or discharge devices configured to discharge the streams supplied thereto into the ambient environment and/or to other devices and/or structures that are configured to receive combustible fuel streams that includes hydrogen gas.

It is within the scope of the present disclosure that PSA assembly 73 may include any suitable number of flow regulating assemblies and/or devices in any suitable location. As an illustrative, non-exclusive example, PSA assembly 73 optionally may further include flow regulating device 202 and/or flow regulating device 203. It is also within the scope of the present disclosure that flow regulating assemblies 200 may include a plurality of flow regulating devices, including one flow regulating device, two flow regulating devices, and/or more than two flow regulating devices arranged in any suitable configuration, such as series, parallel, and/or series-parallel. Illustrative, non-exclusive examples of flow regulating devices according to the present disclosure include any suitable variable orifice structure, such as a variable orifice (proportioning) valve; any suitable fixed-orifice structure, such as an orifice plate, restrictive conduit, and/or fixed orifice valve; any suitable pressure regulation device, such as a pressure regulator, differential pressure regulator, pressure relief valve, forward pressure regulator, back pressure regulator, and/or any suitable device configured to provide a motive force to the fluid flowing therethrough, such as a fan, compressor, ejector, or the like.

Flow regulating assemblies 200 may be designed for automated or manual control. As an illustrative, non-exclusive example, a user may manually actuate the flow regulating assemblies among a plurality of operational configurations based upon any suitable criteria. As another illustrative, non-exclusive example, an electronic controller, such as PSA controller 94 and/or master controller 96, of FIG. 1, may generate a control signal configured to transition the flow regulating assemblies among the plurality of operational configurations. Illustrative, non-exclusive examples of operational configurations for flow regulating assemblies 200 include discrete configurations, such as on/off configurations and/or open/closed configurations, as well as setpoint values for variable configuration devices, and are discussed in more detail herein.

Accumulator 63 may include any suitable structure for storing and/or containing, at least temporarily, a volume of fluid such as PSA effluent stream 75. This may include any suitable pressure vessel, such as a pressure tank, vessel, and/or drum.

Figure 4:
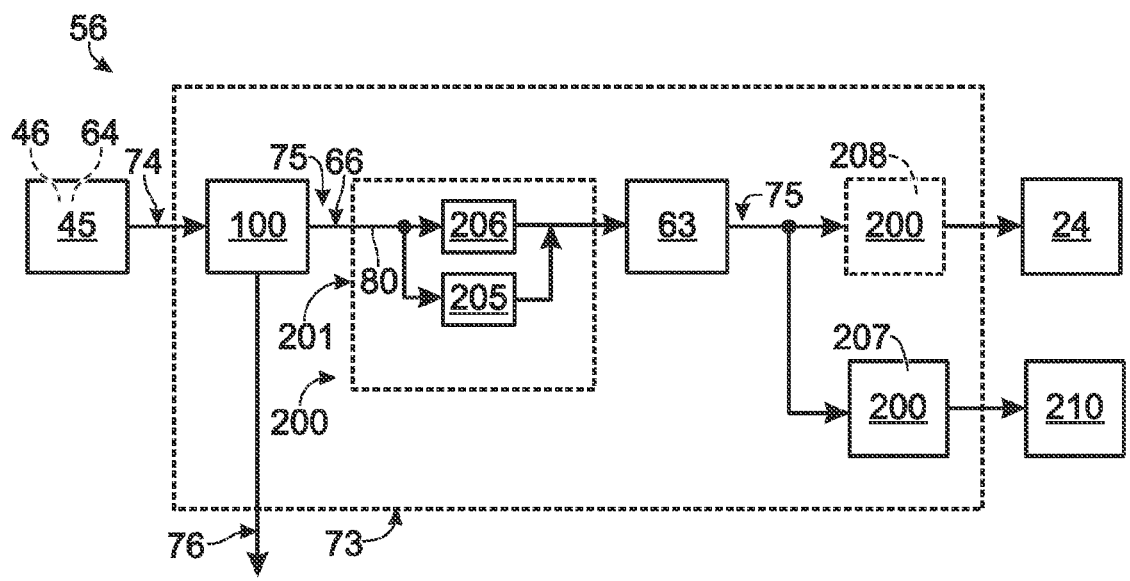
FIG. 4 is an illustrative, non-exclusive example of another energy-producing and consuming assembly, including a pressure swing adsorption assembly, according to the present disclosure.

Another illustrative, non-exclusive example of energy-producing and consuming assembly 56, including pressure swing adsorption assembly 73, according to the present disclosure is shown in FIG. 4. In FIG. 4, flow regulating device 201 includes back pressure regulator 205 and control valve 206. Back pressure regulator 205 may be configured to provide for flow therethrough only when the pressure within PSA adsorbent beds 100 is at or above a pressure threshold, P*, while control valve 206 may be configured to allow or occlude (i.e., permit or prevent) flow therethrough, as desired, controlled, or otherwise selected or configured. FIG. 4 further includes control valve 207 that is configured to regulate or otherwise control the flow of PSA effluent stream 75 to hydrogen disposal device 210 and may optionally include control valve 208 configured to control the flow of PSA effluent stream 75 to fuel cell stack 24, such as when PSA effluent stream 75 is product hydrogen stream 66.

As an illustrative, non-exclusive example of a startup sequence that may be utilized with the system of FIG. 4, the PSA assembly may be in a depressurized shutdown state and may be transitioned to the hydrogen-producing state via the startup state. Initially, control valve 206 may be closed (or in the closed configuration), control valve 207 may be open (or in the open configuration), and optional control valve 208 (if present) may be in the closed configuration. Fuel source 45 may supply mixed gas stream 74 to PSA assembly 73, optionally after producing the mixed gas stream in a hydrogen-producing region thereof. The mixed gas stream may flow into at least one of, some but not all of, or even all of adsorbent beds 100 of the PSA assembly. However, since control valve 206 is closed, the PSA effluent stream may not enter accumulator 63 until the pressure within the adsorbent bed(s) is greater than the pressure setpoint, P*, of back pressure regulator 205. Illustrative, non-exclusive examples of pressure setpoints according to the present disclosure include pressures of 20 to 200 psi, including pressures of, or at least, 60, 65, 70, 75, 80, 85, 90, 100, and 110 psi.

Thus, the adsorbent beds may be pressurized by PSA effluent stream 75 without pressurization of the remainder of the PSA assembly, including accumulator 63, with PSA effluent stream 75. This may restrict impurities 80 (i.e., one or more of the "other gases" discussed herein) to a smaller portion of the energy-producing and consuming assembly than the portion to which they might be restricted without the use of the systems and methods disclosed herein. Once the pressure within adsorbent beds 100 is greater than the pressure setpoint, P*, the PSA effluent stream may flow through accumulator 63 and control valve 207 to hydrogen disposal device 210, such as temperature modulating assembly 71 of FIG. 1.

After the pressure in the adsorbent beds reaches a bed threshold pressure, $P_{T,BED}$, the PSA assembly may begin performing startup cycling. This may include cycling through the series of PSA steps disclosed herein in the same or a similar cycle to the PSA cycle that is performed when the PSA assembly is in the hydrogen-purifying state, which also may be referred to as performing a standard PSA cycle, as well as performing alternative steps and/or changing the cycle time of individual steps. As an illustrative, non-exclusive example, startup cycling may include performing steps that are the same or similar in type/function and/or duration to the steps performed when the PSA assembly is in the hydrogen-purifying state. As another illustrative, non-exclusive example, startup cycling may include performing reduced-duration cycling, such as performing at least a portion of the cycle steps more quickly (or over a shorter period of time) than they would be performed during the hydrogen-purifying state. Illustrative, non-exclusive examples of reduced-duration step times according to the present disclosure include step times that are between 10% and 90% of the hydrogen-purifying state step time, including step times of 20%, 30%, 40%, 50%, 60%, 70%, 80%, 20%-80%, 30%-70%, 40%-60%, and 45%-55% of the hydrogen-purifying state step times.

As yet another illustrative, non-exclusive example, startup cycling may include performing increased-duration cycling, such as performing at least a portion of the cycle steps more slowly (or over a longer period of time) than they would be performed during the hydrogen-purifying state. Illustrative, non-exclusive examples of increased-duration step times according to the present disclosure include step times of 110% to 500% of the hydrogen-purifying state step time, including step times of at least 150%, 200%, 300%, and 400% of the hydrogen-purifying state step time. As yet another illustrative, non-exclusive example, startup cycling may include performing at least one non-standard cycle step that may not be performed when the PSA assembly is in the hydrogen-purifying state, illustrative, non-exclusive examples of which may include evacuation and/or vacuum-assisted purging at least a portion of the PSA assembly.

The startup sequence may include, or utilize, any suitable relationship between pressure threshold P* and bed threshold pressure $P_{T,BED}$. As an illustrative, non-exclusive example, P* may be selected to be approximately equal to $P_{T,BED}$. Additionally or alternatively, and since back pressure regulator 205 may maintain the pressure within adsorbent beds 100 less than or equal to P*, it is within the scope of the present disclosure that $P_{T,BED}$ may be selected to be less than P*. This may include values of $P_{T,BED}$ that are at least 0.1 psi less than the value of P*, including values of $P_{T,BED}$ that are at least 0.25, 0.5, 0.75, 1, 2, 2.5, 3, 4, 5, or 10 psi less than the value of P*.

The startup cycling may be continued until the PSA assembly is ready (i.e., primed and/or conditioned), or substantially ready, to produce a product hydrogen stream, including at least substantially pure hydrogen gas as discussed in more detail herein. This may include performing startup cycling for a fixed period of time, performing a fixed number of startup cycles, performing startup cycles until the concentration of a specific contaminant or contaminants in the PSA effluent stream is less than a threshold value, performing startup cycles until the concentration of hydrogen gas in the PSA effluent stream is greater than (or at least) a threshold value, and/or a combination of the above.

As an illustrative, non-exclusive example, startup cycling may continue until each adsorbent bed of the PSA assembly has been through a total of 1-20 cycles, including a total of 2 cycles, 3, cycles, 4 cycles, 5 cycles, 6 cycles, 10 cycles, or 15 cycles. As another illustrative, non-exclusive example, startup cycling may continue until the concentration of carbon monoxide in the PSA effluent stream is below a threshold level, such as below 0.1-50 ppm, including 0.5, 1, 2, 3, 5, 10, and 25 ppm. As yet another illustrative, non-exclusive example, startup cycling may continue for a fixed time period, such as 1-30 minutes, including startup cycling time periods of at least 2, 3, 4, 5, 7, 10, 15, and 20 minutes. As yet another illustrative, non-exclusive example, startup cycling may continue until multiple criteria are met, such as, for example, a minimum of 2 cycles per adsorbent bed and a maximum of 2 ppm carbon monoxide in the PSA effluent stream.

Once the startup cycles are completed, control valve 207 may close, stopping the flow of PSA effluent stream 75 to hydrogen disposal device 210. When control valve 207 is closed, the pressure within accumulator 63 may increase due to the control valve restricting or even preventing flow of PSA effluent stream 75 out of the accumulator. Since the PSA startup cycles have been completed, the PSA effluent stream may be referred to as product hydrogen stream 66 and may include substantially pure hydrogen gas, or at least will contain substantially lower concentrations of other gases (impurities) and thus much greater purity hydrogen gas than the mixed gas stream.

When the pressure within accumulator 63, $P_A$, is greater than or equal to a threshold value, $P_{T,A}$, control valve 206 may be opened, effectively bypassing back pressure regulator 205. By pressurizing the accumulator with the PSA effluent stream (which, as discussed, may include substantially pure hydrogen gas) instead of the mixed gas stream, the concentration of impurities (other gases) that are present in the mixed gas stream may be prevented from being retained, concentrated, or potentially even present, within the accumulator. Optional control valve 208 also may be opened at this time, thereby providing a fluid flow path for product hydrogen stream 66 from accumulator 63 to fuel cell stack 24.

Figure 5:
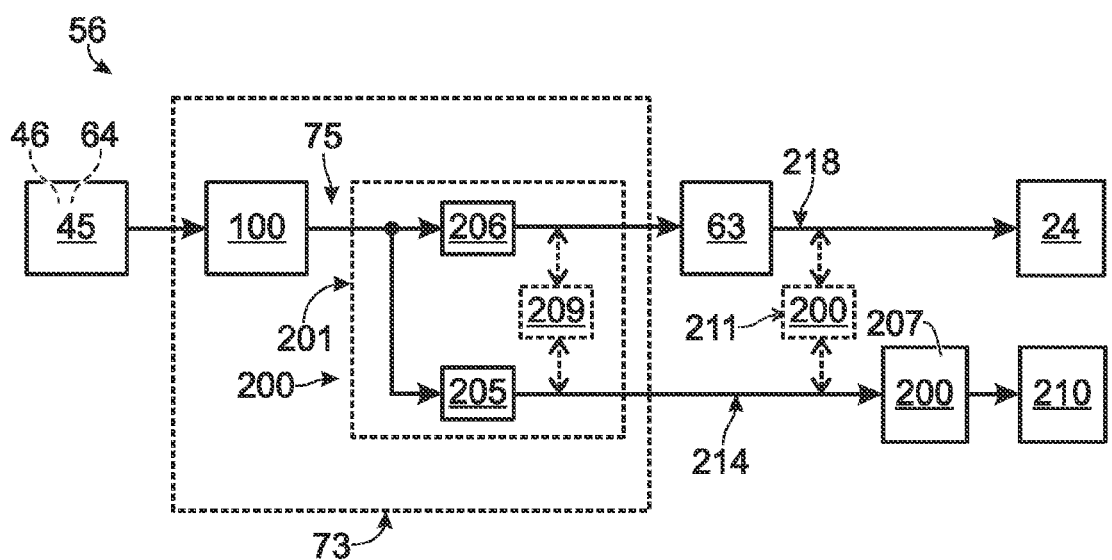
FIG. 5 is an illustrative, non-exclusive example of yet another energy-producing and consuming assembly, including a pressure swing adsorption assembly, according to the present disclosure.

Yet another illustrative, non-exclusive example of energy-producing and consuming assembly 56 including pressure swing adsorption assembly 73 according to the present disclosure is shown in FIG. 5. The device of FIG. 5 is substantially similar to that of FIG. 4 except that the flow of PSA effluent stream 75 through back pressure regulator 205 of flow regulating device 201 creates a bypass stream 214 that may bypass accumulator 63, flowing through control valve 207 to hydrogen disposal device 210. The system optionally may include control valves 209 and/or 211 that are configured to provide a fluid flow path for a portion of bypass stream 214 to combine with a portion of accumulator stream 218.

An illustrative, non-exclusive example of a startup sequence that may be utilized with the system of FIG. 5 may be similar to that described with respect to FIG. 4 except that optional control valves 209 and 211 may be closed initially and the flow of PSA effluent stream 75 through back pressure regulator 205 may bypass accumulator 63 and flow to hydrogen disposal device 210 as bypass stream 214. Once the PSA startup cycles are completed, control valve 207 may close and control valve 209 and/or 211 may open, allowing the PSA effluent stream that passes through back pressure regulator 205 to pressurize accumulator 63. When the pressure within accumulator 63 is greater than or equal to a threshold value, control valve 206 may be opened and control valve 209 and/or 211 may be closed.

Figure 6:
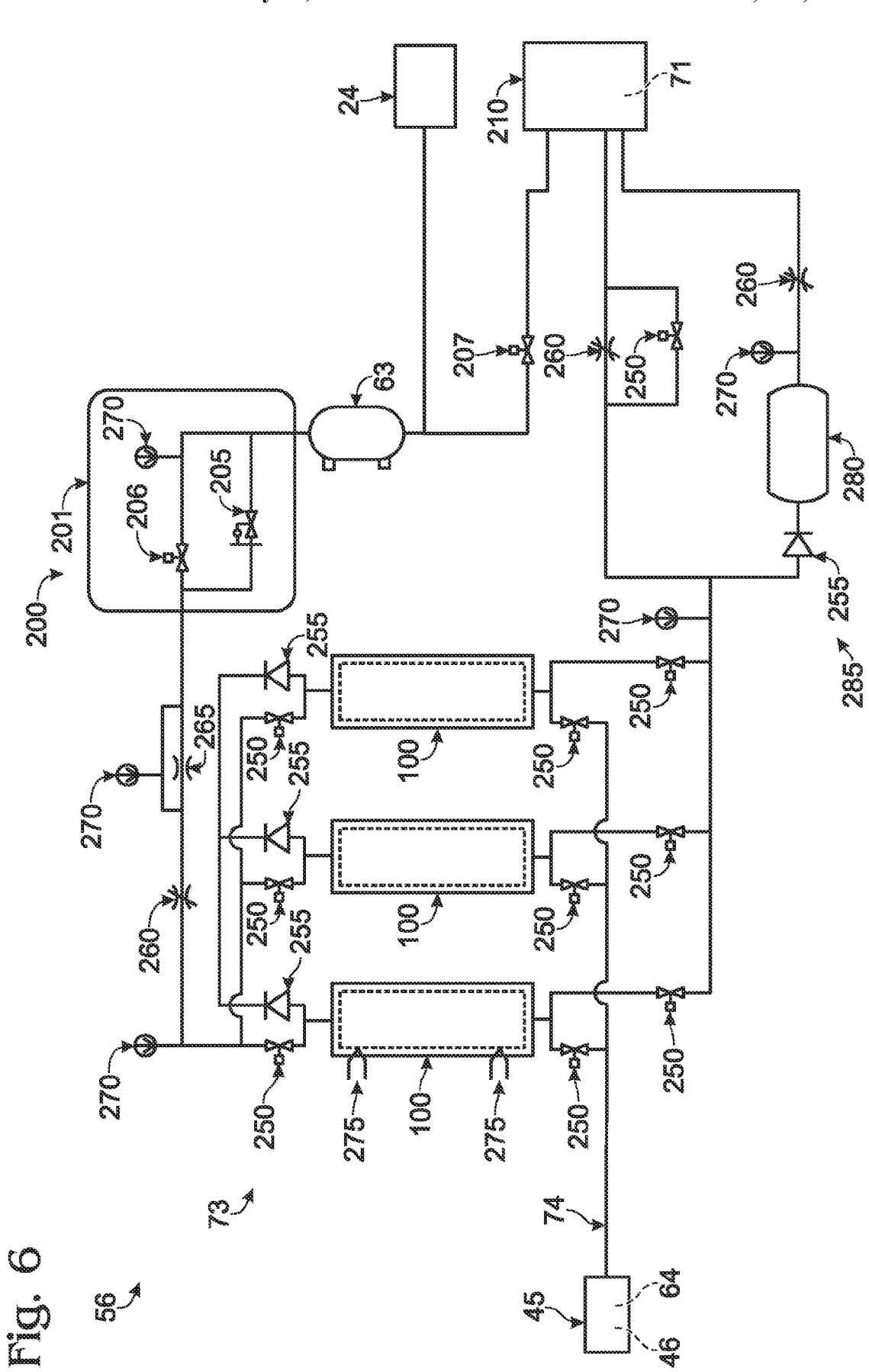
FIG. 6 is an illustrative, non-exclusive example of yet another energy-producing and consuming assembly, including a pressure swing adsorption assembly, according to the present disclosure.

Another illustrative, non-exclusive example of energy-producing and consuming assembly 56 including pressure swing adsorption assembly 73 according to the present disclosure is shown in FIG. 6. FIG. 6 shows a less schematic but still illustrative, non-exclusive configuration including a plurality of adsorbent beds 100, together with a plurality of control valves 250 configured to control the flow of fluid therethrough, and a plurality of check valves 255 configured to provide for fluid flow in one direction, while occluding fluid flow in the opposite direction. The operation of flow regulating device 201 together with control valve 207 and accumulator 63 at system startup may be substantially similar to that described above with respect to FIG. 4. In addition, the system of FIG. 6 includes a plurality of variable orifice (proportioning) valves 260 and a plurality of fixed orifices 265 that are configured to control the flow rate of fluid therethrough, as well as a plurality of pressure sensors 270 and temperature sensors 275. When the PSA assembly is in the hydrogen-purifying state, byproduct flow control system 285 may control the flow of the byproduct stream from the PSA assembly to hydrogen disposal device 210, such as to temperature modulating assembly 71 of hydrogen generation assembly 46.

Figure 7:
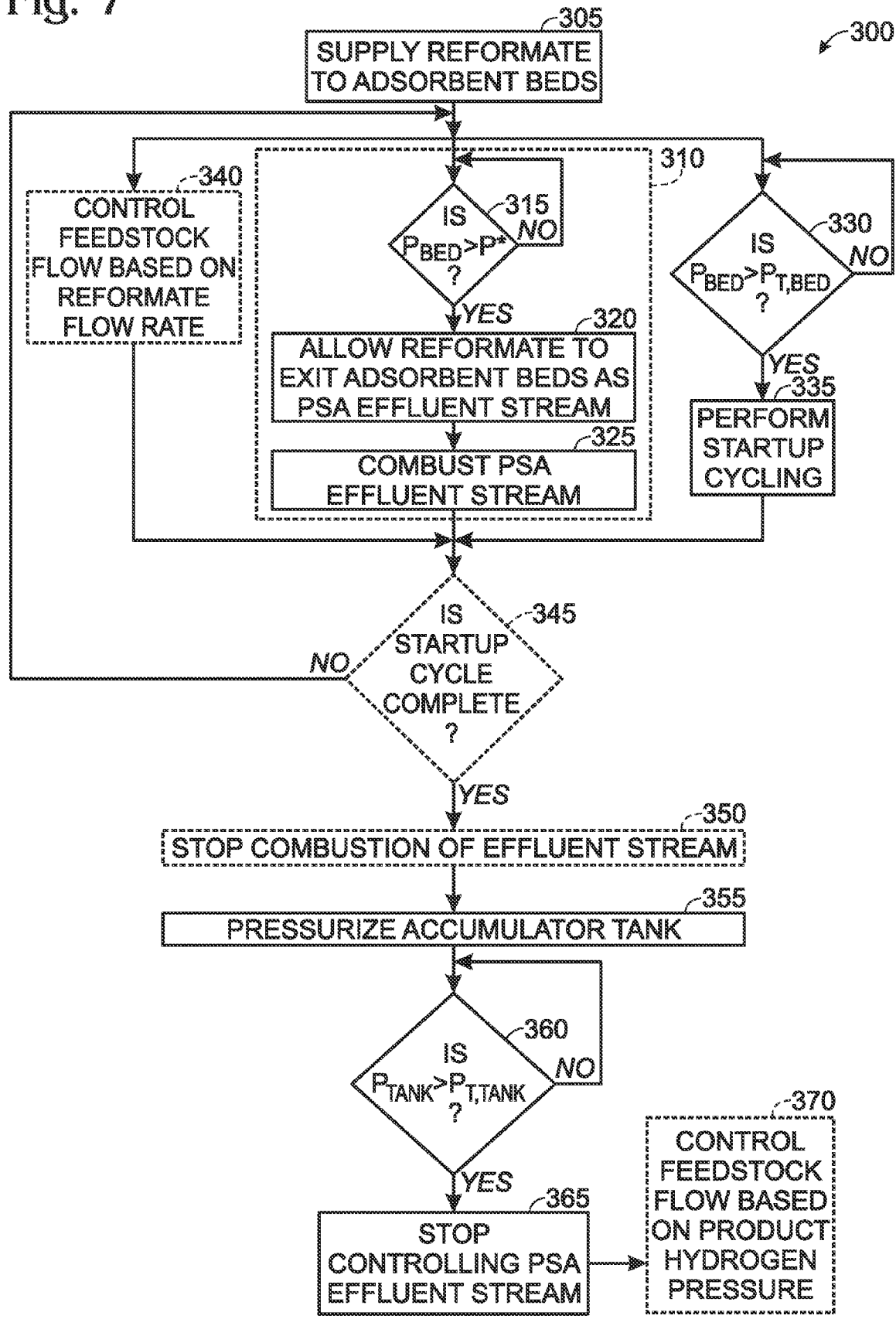
FIG. 7 is an illustrative, non-exclusive example of a flowchart illustrating methods for starting up PSA assemblies according to the present disclosure.

FIG. 7 is an illustrative, non-exclusive example of methods 300 of starting up a PSA assembly according to the present disclosure. The methods may include supplying a reformate, or mixed gas, stream to adsorbent beds 100 of PSA assembly 73 at 305. The methods further may include controlling the flow of the PSA effluent stream at 310, which may include the steps of comparing the pressure within the adsorbent beds to the pressure setpoint, P*, at 315, providing a fluid flow path for the reformate to exit the adsorbent beds as the PSA effluent stream if the pressure within the beds is greater than the pressure setpoint at 320, and combusting the PSA effluent stream at 325. As used herein in the context of controlling the flow of a fluid stream, this controlling may include one or more of regulating, increasing, decreasing, limiting, restricting, enabling, and/or causing the flow of the fluid stream. At least partially in parallel, the methods further may include comparing the pressure within the adsorbent beds to the bed threshold pressure, $P_{T,BED}$, at 330 and performing startup cycling at 335 if the pressure within the adsorbent beds is greater than the bed threshold pressure. Also at least partially in parallel, the methods may optionally include regulating or otherwise controlling the flow rate of feedstock to fuel processing system 64 based at least in part on the flow rate of the reformate, or mixed gas, stream 74 from the fuel processing system at 340.

The methods optionally may further include testing to determine if the startup cycling is complete at 345. If the startup cycling is not complete, the methods may include returning to step 305 to repeat at least a portion of steps 305-340. If the startup cycling is complete, the methods may optionally include stopping combustion of the PSA effluent stream at 350 and pressurizing accumulator 63 at 355. The methods may then include comparing the pressure within the accumulator, $P_A$, to an accumulator pressure threshold, $P_{T,A}$, as indicated at 360. As indicated at 365, the methods may further include ceasing, or stopping, the previously discussed control of the PSA effluent stream (step 310). The methods also may optionally include the step of regulating or otherwise controlling the flow rate of feedstock to the fuel processing system based at least in part on the pressure of the product hydrogen stream.

Supplying reformate to the adsorbent beds at 305 may include supplying reformate from any suitable source, such as the reformate and/or mixed gas stream sources disclosed herein. Controlling the flow of the PSA effluent stream at 310 may include utilizing an electronic controller and a variable flow valve and/or pressure regulator to control the flow rate of the PSA effluent stream. Additionally or alternatively, the flow rate of the PSA effluent stream may be controlled by back pressure regulator 205, such as to control the flow rate of the PSA effluent stream to maintain the pressure within the adsorbent beds at P*. Performing startup cycling at 335 may include performing startup cycles as discussed in more detail herein.

Optionally controlling the flow rate of feedstock to the fuel processing system based at least in part on the flow rate of reformate from the fuel processing system at 340 may include monitoring the flow rate of reformate from the fuel processing system and controlling the flow rate of feedstock based at least in part on the monitored flow rate of reformate. This may include utilizing any suitable mathematical algorithm and/or look-up table to determine the flow rate of feedstock based at least in part on the flow rate of reformate. As an illustrative, non-exclusive example, the flow rate of feedstock may be increased if the flow rate of reformate is less than a threshold value. As another illustrative, non-exclusive example, the flow rate of feedstock may be decreased if the flow rate of reformate is greater than a threshold value. Monitoring the flow rate of reformate from the fuel processing system may include utilizing any suitable flow measurement device, illustrative, non-exclusive examples of which include a mass flow meter and/or a fixed orifice and differential pressure sensor. Determining if the startup cycle is complete at 345 may include comparing the current status of the system to any of the criteria discussed herein for determining that the startup cycle is completed.

Stopping combustion of the PSA effluent stream at 350 may include closing control valve 207 to stop the flow of the PSA effluent stream to hydrogen disposal device 210, such as temperature modulating assembly 71. Pressurizing the accumulator tank at 355 may include accumulating the PSA effluent stream within accumulator tank 63. Stopping controlling the flow of the PSA effluent stream at 365 may include opening control valve 206 so that the PSA effluent stream flows freely between adsorbent beds 100 and accumulator 63.

Optionally controlling the feedstock flow based at least in part on the product hydrogen pressure at 370 may include monitoring the pressure of the product hydrogen stream and/or PSA effluent stream within the energy-producing and consuming assembly and controlling the flow rate of feedstock to the fuel processing system based at least in part on the monitored pressure. The pressure of the product hydrogen stream may be monitored at any suitable location, illustrative, non-exclusive examples of which include any of the pressure detection points shown in FIG. 6, as well as at the exit from accumulator 63, at the entrance to fuel cell stack 24, within fuel cell stack 24, at an exit from fuel cell stack 24, and/or in fluid conduits that interconnect and/or provide fluid flow to and/or from these components. Controlling the flow rate of feedstock may include controlling the flow rate of feedstock to maintain the pressure of the product hydrogen stream at or near a setpoint value. As an illustrative, non-exclusive example, the flow rate of feedstock may be increased if the product hydrogen pressure is below a threshold value. As another illustrative, non-exclusive example, the flow rate of feedstock may be decreased if the product hydrogen pressure is above a threshold value.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically created for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method for controlling the startup of a pressure swing adsorption (PSA) assembly that is configured to receive a mixed gas stream and to produce a product hydrogen stream and a byproduct stream therefrom, the method comprising:

supplying the mixed gas stream to the PSA assembly;

controlling a pressure associated with a portion of the PSA assembly to a setpoint pressure using a flow regulating assembly, wherein the flow regulating assembly is configured to receive the product hydrogen stream from the PSA assembly and to selectively discharge the product hydrogen stream to maintain the pressure associated with the portion of the PSA assembly at the setpoint pressure, and further wherein the flow regulating assembly is in fluid communication with and upstream from an accumulator tank;

detecting the pressure associated with the portion of the PSA assembly;

performing PSA startup cycling, wherein the PSA startup cycling is initiated responsive to detecting that the pressure associated with the portion of the PSA assembly is at least a threshold PSA assembly pressure;

accumulating at least a portion of the product hydrogen stream in the accumulator tank, wherein the accumulating is initiated after the PSA startup cycling is initiated;

detecting a pressure associated with the accumulator tank; and ceasing controlling the pressure associated with the portion of the PSA assembly responsive to detecting that the pressure associated with the accumulator tank is at least a threshold accumulator tank pressure.

A2. The method of paragraph A1, wherein the method further comprises determining that the PSA startup cycling has completed, and further wherein the accumulating is initiated responsive to determining that the PSA startup cycling has completed.

A3. The method of paragraph A1 or A2, wherein the method further includes providing the product hydrogen stream discharged from the flow regulating assembly to a hydrogen disposal device, and optionally wherein the hydrogen disposal device includes at least one of a hydrogen burner, a hydrogen discharge device, and a hydrogen storage device.

A4. The method of paragraph A3, wherein the method further includes ceasing the providing the product hydrogen stream discharged from the flow regulating assembly to the hydrogen disposal device, wherein the ceasing the providing is subsequent to the determining that the PSA startup cycling has completed.

A5. The method of any of paragraphs A2-A4, wherein the method further includes combusting the product hydrogen stream, optionally wherein the hydrogen disposal device includes a temperature modulating assembly, and further optionally wherein the method further includes combusting the product hydrogen stream in the temperature modulating assembly to produce a heated exhaust stream and heating a hydrogen-producing region with the heated exhaust stream.

A6. The method of any of paragraphs A1-A5, wherein the flow regulating assembly includes a back pressure regulator and the method includes controlling the pressure associated with the portion of the PSA assembly with the back pressure regulator.

A7. The method of paragraph A6, wherein the flow regulating assembly includes a fixed orifice valve in parallel with the back pressure regulator, and further wherein ceasing the controlling the pressure associated with the portion of the PSA assembly includes opening the fixed orifice valve to bypass the back pressure regulator.

A8. The method of any of paragraphs A1-A7, wherein the flow regulating assembly includes a variable orifice valve and the method includes controlling the pressure associated with the portion of the PSA assembly by controlling the variable orifice valve, and optionally wherein controlling the variable orifice valve includes controlling an orifice size of the variable orifice valve.

A9. The method of paragraph A8, wherein ceasing the controlling the pressure associated with the portion of the PSA assembly includes ceasing the controlling the variable orifice valve, optionally wherein ceasing the controlling the variable orifice valve includes setting the orifice size of the variable orifice valve to a predetermined orifice size, and further optionally wherein the predetermined orifice size is a maximum orifice size of the variable orifice valve.

A10. The method of any of paragraphs A1-A9, wherein the setpoint pressure is at least 20 psi, optionally including setpoint pressures of 20-200 psi, at least 60 psi, at least 65 psi, at least 70 psi, at least 75 psi, at least 80 psi, at least 85 psi, at least 90 psi, at least 100 psi, or at least 110 psi.

A11. The method of any of paragraphs A1-A10, wherein the threshold PSA assembly pressure is at least one of less than the setpoint pressure and equal to the setpoint pressure.

A12. The method of any of paragraphs A1-A11, wherein controlling the pressure associated with the portion of the PSA assembly includes selectively discharging the product hydrogen stream from the flow regulating assembly as a pressure control stream when the pressure associated with the portion of the PSA assembly is above the setpoint pressure.

A13. The method of paragraph A12, wherein the selectively discharging includes flowing the pressure control stream through the accumulator tank.

A14. The method of any of paragraphs A12-A13, wherein the selectively discharging includes bypassing the accumulator tank with at least a portion of the pressure control stream, and optionally wherein the portion of the pressure control stream includes all of the pressure control stream.

A15. The method of any of paragraphs A1-A14, wherein performing the PSA startup cycling includes performing at least one standard PSA cycle.

A16. The method of any of paragraphs A1-A15, wherein performing the PSA startup cycling includes performing at least one reduced-duration PSA cycle.

A17. The method of any of paragraphs A1-A16, wherein performing the PSA startup cycling includes performing at least one extended-duration PSA cycle.

A18. The method of any of paragraphs A1-A17, wherein performing the PSA startup cycling includes performing at least one non-standard cycle step.

A19. The method of any of paragraphs A1-A18, wherein determining that the PSA startup cycling has completed includes determining that a desired number of PSA startup cycles have been completed, optionally wherein the desired number of PSA startup cycles is between 1 and 20 PSA startup cycles, and further optionally wherein the desired number of PSA startup cycles is 2 cycles, 3 cycles, 4 cycles, 5 cycles, 6 cycles, 10 cycles, or 15 cycles.

A20. The method of any of paragraphs A1-A19, wherein determining that the PSA startup cycling has completed includes determining that PSA startup cycling has been performed for a desired startup cycle time, optionally wherein the desired startup cycle time is between 1 minute and 30 minutes, and further optionally wherein the desired startup cycle time is at least 2 minutes, at least 3 minutes, at least 4 minutes, at least 5 minutes, at least 6 minutes, at least 7 minutes, at least 10 minutes, at least 15 minutes, or at least 20 minutes.

A21. The method of any of paragraphs A1-A20, wherein determining that the PSA startup cycling has completed includes determining that an impurity concentration in the product hydrogen stream is below a threshold impurity concentration.

A22. The method of any of paragraphs A1-A21, wherein the method further includes producing the mixed gas stream.

A23. The method of paragraph A22, wherein producing the mixed gas stream includes supplying at least one feedstock stream to a hydrogen-producing region and producing the mixed gas stream in the hydrogen-producing region.

A24. The method of paragraph A23, wherein the hydrogen-producing region includes at least one of a steam reformer, an autothermal reformer, a pyrolysis reactor, a partial oxidation reactor, and an electrolytic reactor, and optionally wherein the hydrogen-producing region includes a steam reformer configured to generate the mixed gas stream from water and a carbon-containing feedstock, and further optionally wherein the carbon-containing feedstock includes methanol.

A25. The method of any of paragraphs A23-A24, wherein the method further includes controlling a flow rate of the at least one feedstock stream to the hydrogen-producing region.

A26. The method of paragraph A25, wherein the method further includes detecting a flow rate of the mixed gas stream, and further wherein controlling the flow rate of the at least one feedstock stream includes controlling the flow rate of the at least one feedstock stream responsive to the flow rate of the mixed gas stream.

A27. The method of any of paragraphs A25-A26, wherein the method further includes detecting a pressure associated with the product hydrogen stream, and further wherein, subsequent to determining that the PSA startup cycling has completed, the method includes controlling the flow rate of the at least one feedstock stream responsive to the pressure associated with the product hydrogen stream.

A28. The method of any of paragraphs A1-A27, wherein the PSA assembly includes a plurality of adsorbent beds, and further wherein the portion of PSA assembly includes at least a portion of the plurality of adsorbent beds.

A29. The method of any of paragraphs A1-A28, wherein the method further includes providing at least a portion of the product hydrogen stream to a fuel cell stack, and optionally wherein the method further includes producing an electrical output from the fuel cell stack.

A30. The method of paragraph A29, wherein the method further includes supplying the electrical output to an energy-consuming device.

B1. A fuel processing system comprising:
a supply conduit configured to provide a mixed gas stream;
a pressure swing adsorption (PSA) assembly configured to receive the mixed gas stream and to produce a product hydrogen stream and a byproduct stream therefrom;
a flow regulating assembly configured to receive the product hydrogen stream from the pressure swing adsorption assembly and to selectively discharge a flow-regulated product hydrogen stream, wherein the flow regulating assembly is configured to selectively discharge the flow-regulated product hydrogen stream to maintain a pressure associated with a portion of the PSA assembly at a setpoint pressure; and
an accumulator tank in fluid communication with the flow-regulated product hydrogen stream and configured to selectively accumulate at least a portion of the flow-regulated product hydrogen stream therein.

B2. The system of paragraph B1, wherein the system further includes a controller configured to perform the method of any of paragraphs A1-A30.

B3. The system of any of paragraphs B1-B2, wherein the system further includes a PSA assembly pressure detector configured to detect a pressure associated with the PSA assembly.

B4. The system of paragraph B3, wherein the system further includes a controller configured to control the operation of the PSA assembly, and further wherein the controller is configured to initiate startup cycling of the PSA assembly responsive to the PSA assembly pressure detector detecting that the pressure associated with the PSA assembly is greater than a threshold PSA assembly pressure.

B5. The system of paragraph B4, wherein the controller is further configured to determine that the startup cycling of the PSA assembly has completed.

B6. The system of any of paragraph B1-B5, wherein the system further includes a discharge valve configured to control a flow of the product hydrogen stream from the fuel processing system, wherein, when the discharge valve is in an open state, the product hydrogen stream is discharged from the fuel processing system without substantial accumulation within the accumulator tank, and further wherein, when the discharge valve is in a closed state, at least a portion of the product hydrogen stream accumulates in the accumulator tank.

B7. The system of paragraph B6, wherein the controller is configured to control the operation of the discharge valve, and optionally wherein the controller is configured to control the discharge valve to be in the open state prior to determining that the startup cycling of the PSA assembly has completed, and further optionally wherein the controller is configured to control the discharge valve to be in the closed state subsequent to determining that the startup cycling of the PSA assembly has completed.

B8. The system of any of paragraphs B1-B7, wherein the flow regulating assembly includes a back pressure regulator and a fixed orifice valve that provide parallel fluid flow paths for the product hydrogen stream through the flow regulating assembly, wherein, when the fixed orifice valve is in the closed state, the pressure associated with the PSA assembly is controlled by the back pressure regulator, and further wherein, when the fixed orifice valve is in the open state, the pressure associated with the PSA assembly is not controlled by the back pressure regulator.

B9. The system of any of paragraphs B1-B8, wherein the system further includes an accumulator tank pressure detector configured to detect a pressure associated with the accumulator tank.

B10. The system of paragraph B9, wherein the controller is configured to transition the fixed orifice valve from the closed state to the open state responsive to the accumulator tank pressure detector detecting that the pressure associated with the accumulator tank is at least a threshold accumulator tank pressure.

B11. The system of any of paragraphs B1-B10, wherein the flow regulating assembly includes a variable orifice valve, wherein the variable orifice valve includes a plurality of operational states including at least a closed state, in which there is no fluid flow therethrough, a fully open state, in which a fluid flow therethrough is at a maximum valve, and an intermediate state, in which there is a fluid flow therethrough but in which the fluid flow therethrough is less than the maximum value.

B12. The system of paragraph B11, wherein the controller is configured to transition the variable orifice valve from at least one of the closed state and the intermediate state to the fully open state responsive to the accumulator tank pressure detector detecting that the pressure associated with the accumulator tank is at least a threshold accumulator tank pressure.

B13. The system of any of paragraphs B6-B12, wherein the system is in fluid communication with a hydrogen disposal device, and further wherein, when the discharge valve is in the open state, the product hydrogen stream is supplied to the hydrogen disposal device.

B14. The system of paragraph B13, wherein the hydrogen disposal device includes at least one of a hydrogen burner, a hydrogen discharge device, and a hydrogen storage device.

B15. The system of any of paragraphs B13-B14, wherein the hydrogen disposal device includes a temperature modulating assembly configured to combust the product hydrogen stream to produce a heated exhaust stream, and optionally wherein the system further includes a hydrogen-producing region configured to produce the mixed gas stream, and further optionally wherein the system is configured to heat the hydrogen-producing region with the heated exhaust stream.

B16. The system of any of paragraphs B1-B15, wherein the setpoint pressure is at least 20 psi, optionally including setpoint pressures of 20-200 psi, at least 60 psi, at least 65 psi, at least 70 psi, at least 75 psi, at least 80 psi, at least 85 psi, at least 90 psi, at least 100 psi, or at least 110 psi.

B17. The system of any of paragraphs B4-B16, wherein the threshold PSA assembly pressure is at least one of less than the setpoint pressure and equal to the setpoint pressure.

B18. The system of any of paragraphs B1-B17, wherein the system further includes a hydrogen-producing region configured to receive a feedstock stream and to produce the mixed gas stream therefrom.

B19. The system of paragraph B18, wherein the hydrogen-producing region includes at least one of a steam reformer, an autothermal reformer, a pyrolysis reactor, a partial oxidation reactor, and an electrolytic reactor, and optionally wherein the hydrogen-producing region includes a steam reformer configured to generate the mixed gas stream from water and a carbon-containing feedstock, and further optionally wherein the carbon-containing feedstock includes methanol.

B20. The system of any of paragraphs B18-B19, wherein the controller is configured to control a flow rate of the feedstock stream to the hydrogen-producing region.

B21. The system of any of paragraphs B1-B20, wherein the system further includes a mixed gas flow detector configured to detect a flow rate of the mixed gas stream.

B22. The system of paragraph B21, wherein the controller is configured to control the flow rate of the feedstock stream to the hydrogen-producing region responsive to the flow rate of the mixed gas stream.

B23. The system of any of paragraphs B1-B22, wherein the system further includes a product hydrogen stream pressure detector configured to detect a pressure associated with the product hydrogen stream.

B24. The system of paragraph B23, wherein, subsequent to determining that the startup cycling of the PSA assembly has completed, the controller is configured to control the flow rate of the feedstock stream to the hydrogen-producing region responsive to the pressure associated with the product hydrogen stream.

B25. The system of any of paragraphs B1-B24, wherein the PSA assembly includes a plurality of adsorbent beds, and further wherein the portion of the PSA assembly includes a portion of the plurality of adsorbent beds.

B26. The system of any of paragraphs B1-B25, wherein the system further includes a fuel cell stack configured to receive the product hydrogen stream from the fuel processing system and to produce an electrical output therefrom.

B27. The system of paragraph B26, wherein the system further includes an energy consuming device configured to receive the electrical output from the fuel cell stack.

B28. An energy-producing system including:
a fuel cell stack; and
the fuel processing system of any of paragraphs B1-B27.

B29. An energy-producing and consuming assembly including:
an energy consuming assembly; and
the energy producing system of paragraph B28.

C1. The use of any of the methods of any of paragraphs A1-A30 with any of the systems of any of paragraphs B1-B28.

C2. The use of any of the systems of any of paragraphs B1-B29 with any of the methods of any of paragraphs A1-A30.

C3. The use of any of the methods of any of paragraphs A1-A30 to purify hydrogen gas.

C4. The use of any of the systems of any of paragraphs B1-B29 to purify hydrogen gas.

C5. The use of any of the methods of any of paragraphs A1-A30 in an energy-producing system.

C6. The use of any of the systems of any of paragraphs B1-B29 in an energy-producing system.

C7. The use of any of the methods of any of paragraphs A1-A30 in an energy producing and consuming assembly.

C8. The use of any of the systems of any of the paragraphs B1-B29 in an energy producing and consuming assembly.

C9. The use of any of the methods of any of paragraphs A1-A30 to produce electricity.

C10. The use of any of the systems of any of paragraphs B1-B29 to produce electricity.

INDUSTRIAL APPLICABILITY

The systems and methods disclosed herein are applicable to the hydrogen-processing fields.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for controlling the startup of a pressure swing adsorption (PSA) assembly that is configured to receive a mixed gas stream and to produce a product hydrogen stream and a byproduct stream therefrom, the method comprising:
supplying the mixed gas stream to the PSA assembly;
controlling a pressure associated with a portion of the PSA assembly to a setpoint pressure using a flow regulating assembly, wherein the flow regulating assembly is configured to receive the product hydrogen stream from the PSA assembly and to selectively discharge the product hydrogen stream to maintain the pressure associated with the portion of the PSA assembly at the setpoint pressure, and further wherein the flow regulating assembly is in fluid communication with and upstream from an accumulator tank;
detecting the pressure associated with the portion of the PSA assembly;
performing PSA startup cycling, wherein the PSA startup cycling is initiated responsive to detecting that the pressure associated with the portion of the PSA assembly is at least a threshold PSA assembly pressure;
accumulating at least a portion of the product hydrogen stream in the accumulator tank, wherein the accumulating is initiated after the PSA startup cycling is initiated;
detecting a pressure associated with the accumulator tank; and
ceasing controlling the pressure associated with the portion of the PSA assembly responsive to detecting that the pressure associated with the accumulator tank is at least a threshold accumulator tank pressure.

2. The method of claim 1, wherein the method further comprises determining that the PSA startup cycling has completed, and further wherein the accumulating is initiated responsive to determining that the PSA startup cycling has completed.

3. The method of claim 1, wherein the method further includes providing the product hydrogen stream discharged from the flow regulating assembly to a hydrogen disposal device.

4. The method of claim 3, wherein the method further includes ceasing the providing the product hydrogen stream discharged from the flow regulating assembly to the hydrogen disposal device, wherein the ceasing the providing is subsequent to the determining that the PSA startup cycling has completed.

5. The method of claim 1, wherein the flow regulating assembly includes a back pressure regulator and the method includes controlling the pressure associated with the portion of the PSA assembly with the back pressure regulator.

6. The method of claim 5, wherein the flow regulating assembly includes a fixed orifice valve in parallel with the back pressure regulator, and further wherein ceasing the controlling the pressure associated with the portion of the PSA assembly includes opening the fixed orifice valve to bypass the back pressure regulator.

7. The method of claim 1, wherein the flow regulating assembly includes a variable orifice valve and the method includes controlling the pressure associated with the portion of the PSA assembly by controlling the variable orifice valve.

8. The method of claim 1, wherein the threshold PSA assembly pressure is at least one of less than the setpoint pressure and equal to the setpoint pressure.

9. The method of claim 1, wherein controlling the pressure associated with the portion of the PSA assembly includes selectively discharging the product hydrogen stream from the flow regulating assembly as a pressure control stream when the pressure associated with the portion of the PSA assembly is above the setpoint pressure.

10. The method of claim 9, wherein the selectively discharging includes flowing the pressure control stream through the accumulator tank.

11. The method of claim 9, wherein the selectively discharging includes bypassing the accumulator tank with at least a portion of the pressure control stream.

12. The method of claim 1, wherein performing the PSA startup cycling includes performing at least one reduced-duration PSA cycle.

13. The method of claim 1, wherein the method further includes producing the mixed gas stream.

14. The method of claim 13, wherein producing the mixed gas stream includes supplying at least one feedstock stream to a hydrogen-producing region and producing the mixed gas stream in the hydrogen-producing region, wherein the method further includes controlling a flow rate of the at least one feedstock stream to the hydrogen-producing region, wherein the method further includes detecting a flow rate of the mixed gas stream, and further wherein controlling the flow rate of the at least one feedstock stream includes controlling the flow rate of the at least one feedstock stream responsive to the flow rate of the mixed gas stream.

15. The method of claim 14, wherein the method further includes detecting a pressure associated with the product hydrogen stream, and further wherein, subsequent to determining that the PSA startup cycling has completed, the method includes controlling the flow rate of the at least one feedstock stream responsive to the pressure associated with the product hydrogen stream.

16. The method of claim 1, wherein the PSA assembly includes a plurality of adsorbent beds, and further wherein the portion of PSA assembly includes at least a portion of the plurality of adsorbent beds.

* * * * *